United States Patent
Møller

(10) Patent No.: US 9,960,659 B2
(45) Date of Patent: May 1, 2018

(54) PROTECTION OF A PERMANENT MAGNET GENERATOR

(71) Applicant: VESTAS WIND SYSTEMS A/S, Aarhus N (DK)

(72) Inventor: Torben Werge Møller, Ringkøbing (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 903 days.

(21) Appl. No.: 14/356,329

(22) PCT Filed: Nov. 15, 2012

(86) PCT No.: PCT/DK2012/050420
§ 371 (c)(1),
(2) Date: May 5, 2014

(87) PCT Pub. No.: WO2013/071937
PCT Pub. Date: May 23, 2013

(65) Prior Publication Data
US 2014/0306583 A1    Oct. 16, 2014

Related U.S. Application Data

(60) Provisional application No. 61/560,991, filed on Nov. 17, 2011.

(30) Foreign Application Priority Data

Nov. 16, 2011 (DK) .......................... PA 2011 70626

(51) Int. Cl.
*H02H 7/06* (2006.01)
*H02K 11/00* (2016.01)
*H02K 11/27* (2016.01)

(52) U.S. Cl.
CPC ........... *H02K 11/0057* (2013.01); *H02H 7/06* (2013.01); *H02K 11/27* (2016.01)

(58) Field of Classification Search
CPC ....... H02K 11/0057; H02K 11/27; H02H 7/06
(Continued)

(56) References Cited

U.S. PATENT DOCUMENTS 4,950,973 A * 8/1990 Kouba .................. H02H 7/06
322/59
5,382,859 A * 1/1995 Huang .................. H02K 1/16
310/216.008
5,805,394 A    9/1998 Glennon
(Continued)

FOREIGN PATENT DOCUMENTS

JP    2000333359 A *  5/1999
SU    1818658 A1 *  5/1993
(Continued)

OTHER PUBLICATIONS

Danish Search Reoport for PA 2011 70626, dated May 7, 2012.
International Search Report for PCT/DK2012/050420, dated Feb. 21, 2013.

*Primary Examiner* — Kawing Chan
(74) *Attorney, Agent, or Firm* — Patterson + Sheridan, LLP

(57) ABSTRACT

The present invention relates to a protection system with a protection relay and at least one measurement sensor to protect a permanent magnet generator having a plurality of stator windings, each of said stator windings having a first end and a second end. If the stator windings are connected in a wye coupling, they are, in a set of three stator windings, commonly coupled in a star point at the first end of the windings, or if the stator windings are connected in a delta coupling, they are, in a set of three stator windings, commonly connected in a ring to each other. In addition, the at least one measurement sensor is arranged for measuring (Continued)

current through at least one of the stator windings at the star point side or within the ring connection and for communicating with the protection relay. The invention also relates to a method of protecting a permanent magnet generator.

14 Claims, 8 Drawing Sheets

(58) Field of Classification Search
USPC .......................................................... 361/20
See application file for complete search history.

(56) References Cited

U.S. PATENT DOCUMENTS

| | | | | |
|---|---|---|---|---|
| 6,147,847 | A * | 11/2000 | Hochgraef | G01R 19/25 361/93.1 |
| 8,043,383 | B2 * | 10/2011 | Tutin | A62D 3/33 427/248.1 |
| 2007/0030606 | A1 | 2/2007 | Ganev et al. | |
| 2007/0146946 | A1 * | 6/2007 | Chen | H01H 83/14 361/42 |
| 2008/0043383 | A1 | 2/2008 | Shah et al. | |
| 2010/0090683 | A1 * | 4/2010 | Bose | G01R 15/202 324/117 H |
| 2013/0054144 | A1 * | 2/2013 | Caird | H02H 3/006 702/4 |

FOREIGN PATENT DOCUMENTS

| | | |
|---|---|---|
| WO | 2004/040732 A1 | 5/2004 |
| WO | 2006008331 A1 | 1/2006 |

* cited by examiner

Double system setup (without angular shift between A and B)

Differential current measurement (symmetry detection relay)

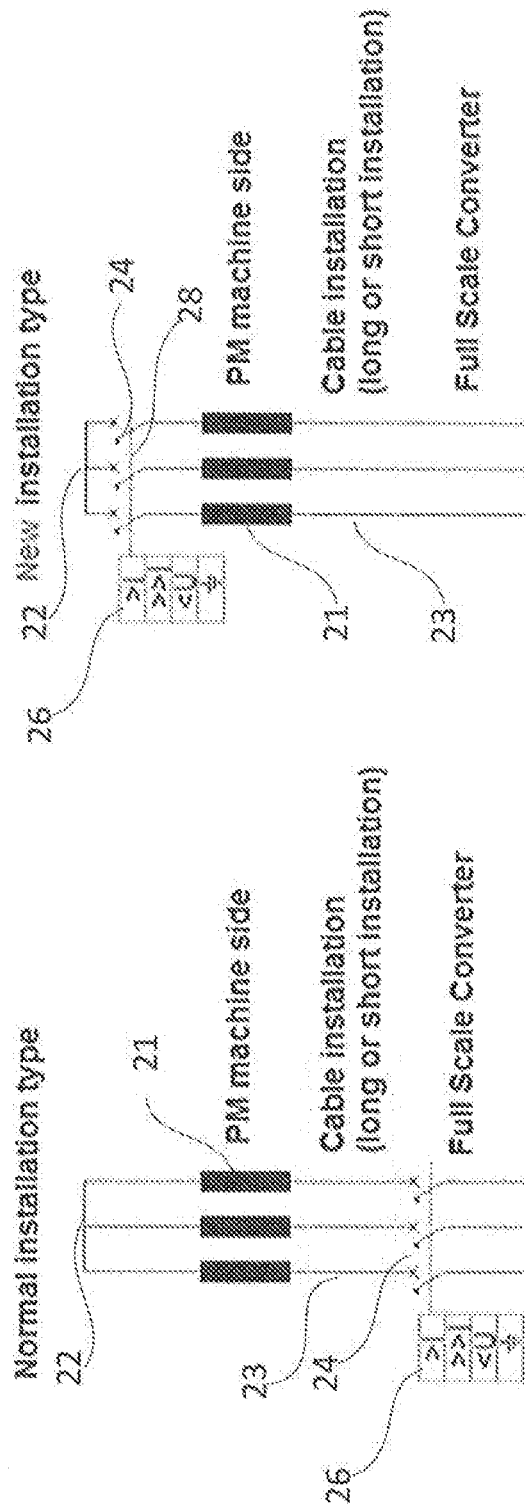

PROTECTION OF A PERMANENT MAGNET GENERATOR

FIELD OF THE INVENTION

The present invention generally relates to a protection system for protecting a permanent magnet generator; the invention also generally relates to a permanent magnet generator and a method for protecting a permanent magnet generator.

BACKGROUND OF THE INVENTION

An electrical machine converts energy between mechanical energy of the rotating rotor and electrical energy. A motor converts electrical energy into rotating mechanical torque, and a generator converts a rotating mechanical torque into electrical energy.

Different types of alternating current (AC) electrical machines are available. They can be grouped into two different types, a synchronous type machine and an asynchronous type machine.

A synchronous machine is an alternating current (AC) rotating machine whose speed under steady state condition is proportional to the frequency of the current in its armature. The magnetic field created by the armature currents rotates at the same speed as that created by the field current on the rotor, which is rotating at the synchronous speed, and a steady torque results. Synchronous machines are commonly used as generators especially for large power systems, such as turbine generators and hydroelectric generators in the grid power supply. Because the rotor speed is proportional to the frequency of excitation, synchronous motors can be used in situations where constant speed drive is required.

An induction or asynchronous motor is a type of AC motor where power is supplied to the rotor by means of electromagnetic induction. These motors are widely used in industrial drives, particularly polyphase induction motors, because they are robust and have no brushes. Their speed can be controlled with a variable frequency drive also known as a power converter or a frequency converter.

When the magnetic field that excites current flow in stator windings of an electrical machine is provided by means of a permanent magnet (as opposed to a coil or winding in the rotor), the machine is known as a permanent magnet synchronous machine. Thus, a "permanent magnet generator" as the term is used herein, is a generator that has a plurality of stator windings and one or more permanent magnets whose magnetic field excites current flow in the stator windings during operation.

An electrical machine can end up in a failure mode with different fault scenarios. Typical examples of fault scenarios include:
- open-circuit of a stator phase (e.g., a connecting cable is broken or an open circuit breaker or open contactor)
- short-circuit phase to ground (e.g., insulation failure because of mechanical damage, or damage due to e.g. partial discharge)
- short-circuit of one or more phase windings (e.g., insulation failure because of thermal stress within the stator or rotor, or damage due to e.g. partial discharge)

There are several reasons to short circuits faults in electrical machines; common for all of them is the importance of disconnecting the electrical machine from the electrical supply whenever a fault is detected. A generator without a magnetic field can't produce any power even if there is a mechanical torque on the shaft. Whereas a permanent magnet generator always has full magnetic field all the time, because of the permanent magnets, and thus it is capable of producing electrical power whenever there is a mechanical torque on the shaft. The possibility to demagnetise the machine via a control circuit of the excitation current to the rotor circuit does not exist on permanent magnet machines.

In renewable energy power plants it is more and more common to use permanent magnet generators, this can be in wind turbine generators, wave power plants or others where an energy conversion from mechanical to electrical energy is needed.

If a short circuit fault in a permanent magnet generator is not detected it can cause fire in the generator and its surroundings, thus it is important to be able to detect a short circuit fault in a permanent magnet generator. The present invention presents a solution to protect permanent magnet generators.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, the present invention relates to a protection system with a protection relay and at least one measurement sensor to protect a permanent magnet generator having a plurality of stator windings, each of said stator windings having a first end and a second end. If said stator windings are connected in a wye coupling, they are, in a set of three stator windings, commonly coupled in a star point at the first end of each of the stator windings, or if said stator windings are connected in a delta coupling, they are, in a set of three stator windings, commonly connected in a ring to each other. In addition, the at least one measurement sensor is arranged for measuring a parameter at the first end of at least one of the stator windings and for communicating the measured parameter to the protection relay.

An advantage of the first aspect is that faults can be detected early, whether they occur during operation or while the generator is idling without a converter connection.

An early detection of faults in the generator minimizes the risk of fires in the generator and it surroundings.

For wind turbine generator applications the risk of fire can cause even higher damages as the turbines are often located remote and thus a fire in a wind turbine generator may cause a severe damage or even destroy the nacelle and the blades.

According to one embodiment of the invention, the at least one measurement sensor is a current sensor for measuring the current in the at least one stator winding.

An advantage of this embodiment of the present invention is that a main source for overheat and in the end to cause fire is over current so it is important to monitor the current level in the generator.

According to one embodiment of the invention the protection system is arranged for protecting a generator with at least one set of three stator windings, wherein each winding is sensed with a current sensor.

According to one embodiment of the invention, the protection system further comprising a circuit breaker arranged for disconnecting the generator from an electrical grid, and wherein the protection relay communicates with the circuit breaker.

An advantage of this embodiment of the present invention is that in case of a fault it is important to be able to disconnect the generator from the grid.

According to one embodiment of the invention the protection system is arranged for protecting a generator, wherein the generator comprises more than one segment, each segment comprises one or more set(s) of three stator windings, wherein each set of three stator windings is commonly connected.

An advantage of this embodiment of the present invention is that when operating a large segmented generator it is an advantage to disconnect a failed segment, while continuing operation using the non-failed segments.

According to one embodiment of the invention each segment has at least one protection relay arranged for protecting the one or more set(s) of three stator windings of the corresponding segment.

An advantage of this embodiment of the present invention is that it possible to protect a segmented generator in a way where each segment can be disabled in case of an electrical fault.

According to one embodiment of the invention the protection system is arranged for protecting a generator with more than one set of three stator windings, wherein each set of three stator windings is electrically phase shifted in relation to each other.

An advantage of this embodiment of the present invention is that when making a larger electrical machine it is in some cases preferred to make a machine with N times three stators, wherein N is an integer 2 or larger, to benefit from this 6, 9 or a higher number of phases is necessary to insert the phase windings in the stator slots in a manner that will leave the phases in one set of three phase winding electrically out of phase with another set of three phase winding, a displacement angle of 30 degrees (electrical) can be used, but not limited to this value, angles of 10, 15 or 20 degrees also provide harmonic elimination.

According to one embodiment of the invention the protection relay is arranged for compensating for the phase shift between the sets of three stator windings.

According to one embodiment of the invention the second end of each of the plurality of stator windings opposite the first end at which each of the stator windings is commonly coupled in a star point, is a terminal end, and wherein the protection system further comprises at least one additional measurement sensor to measure a parameter at the terminal end of at least one of the stator windings, and wherein the protection relay is arranged for communicating with both sensors and comparing both measured parameters.

An advantage of this embodiment of the present invention is that it possible to detect leakage currents in each phase winding, as the current is measured in both ends of the winding.

According to one embodiment of the invention a permanent magnet generator is implemented with a protection system described above.

In a second aspect, the present invention relates to method for protecting a permanent magnet generator with a protection system comprising a protection relay and at least one measurement sensor, said permanent magnet generator having a plurality of stator windings, wherein if said stator windings are connected in a wye coupling, they are, in a set of three stator windings, commonly coupled in a star point at the first end of the windings, and if said windings are connected in a delta coupling, they are, in a set of three stator windings, commonly connected in a ring to each other, the method comprising the steps of:

measuring a parameter at the first end of at least one of the stator windings with the at least one measurement sensor, communicating the measured parameter to the protection relay, comparing the measured parameter with a first threshold value, and tripping the protection relay if said measured parameter is beyond the first threshold value.

Advantages of the second aspect and its embodiments are equivalent to the advantages for the first aspect of the present invention.

According to one embodiment of the second aspect of the invention the parameter is a current in the at least one stator winding.

According to one embodiment of the second aspect of the invention the permanent magnet generator has at least one set of three stator windings, and wherein the current in each stator winding is measured with a different current sensor.

According to one embodiment of the second aspect of the invention the generator comprises more than one segment, each segment comprises one or more set(s) of three stator windings, and each segment has at least one protection relay arranged for protecting the one or more set(s) of three stator windings of the corresponding segment, wherein each set of three stator windings is connected in a wye or a delta coupling, the method further comprising the step of:
  if the measured parameter is above the first threshold value, selecting the protection relay corresponding to the one or more set(s) of three stator windings related to the measured parameter, and
  disconnect the one or more set(s) of three stator windings via the selected protection relay.

According to one embodiment of the second aspect of the invention the generator has more than one set of three stator windings, wherein each set of three stator windings is electrically phase shifted in relation to each other.

According to one embodiment of the second aspect of the invention the protection relay protects each set of three stator windings individually.

According to one embodiment of the second aspect of the invention the protection relay is arranged for taking into account the phase shift between the sets of three stator windings.

According to one embodiment of the second aspect of the invention, the method further comprises the steps of
  measuring a parameter at a second end of the at least one stator winding,
  communicating the second end measured parameter to the protection relay,
  finding a difference between the first end and the second end measured parameters,
  tripping the protection relay if said difference is beyond a second threshold value.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE DRAWINGS

FIG. 7 shows the protection of a generator and cabling according to the prior art.

FIG. 8 shows the protection of a generator and cabling according to an embodiment of the present invention.

DETAILED DESCRIPTION OF THE INVENTION

Figure 1:
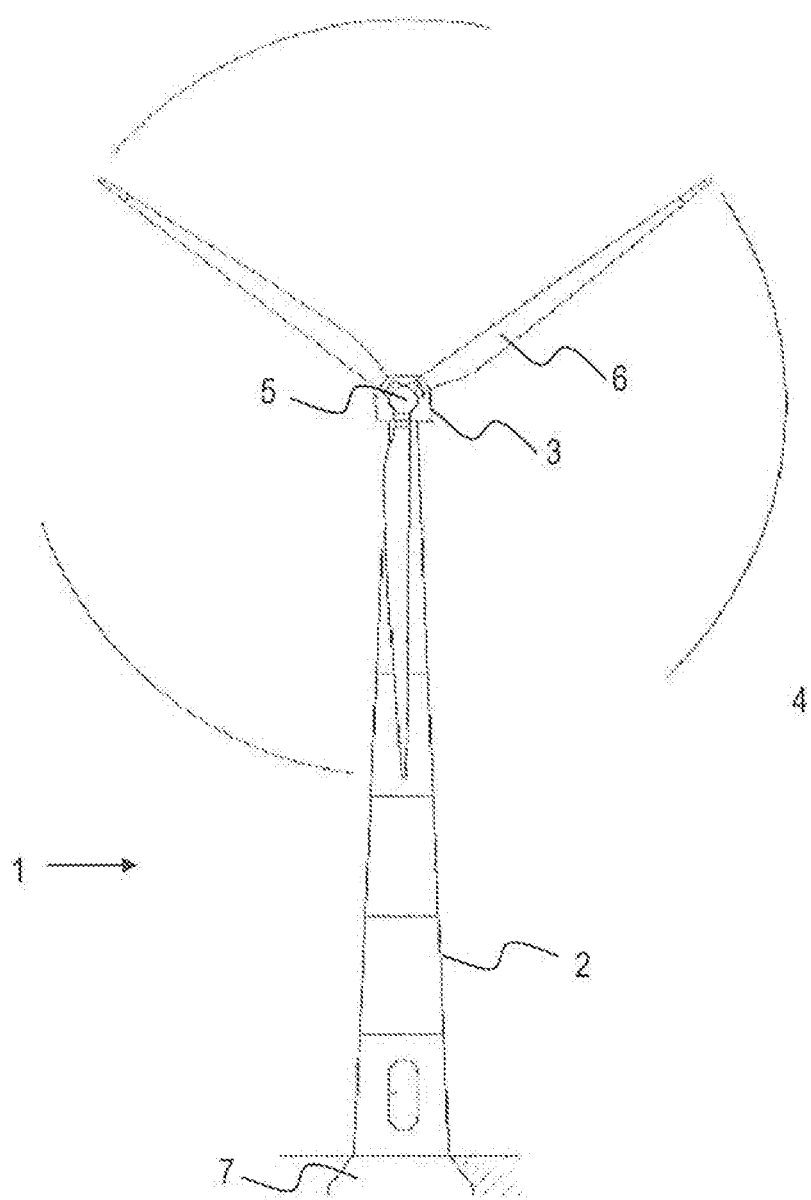
FIG. 1 shows a general structure of a wind turbine generator.

Example embodiments of the present invention will now be explained in further details. While embodiments of the invention are susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the embodiments of the invention as defined by the appended claims.

In renewable energy power plants it is more and more common to use permanent magnet generators. The power plant can be a wind power plant, a wave power plant, or any other type where an energy conversion from mechanical to electrical is needed.

An internal short circuit event in an electrical machine, either a motor or a generator, is not detectable under certain conditions, e.g., in idling modes on a wind turbine generator, or other energy plant where the fluid for rotating the shaft is present all the time. This could drive high constant fault current into an internal fault causing a potential fire risk to the turbine. All in all detection, parking of a wind turbine generator drive train and trigging of a fast service response is important. The allowable service response time in these cases are low and the requirement of applying e.g. the parking brake to the drive train is limited in time to avoid damage to the gearbox bearings and sprockets.

Embodiments of the present invention move the measurement circuit transformers to the generator star point or into the delta coupling and thus provide current load information independent of operational stage. In case of, e.g., a permanent short circuit at idle the fault is detected and preventive measures can be handled by service personnel.

In one embodiment, current protection coils or current sensors/transformers are installed at the star point end of the generator stator windings, making detection of faults possible during operation as well as under idling without a power converter connection or grid connection.

If a short circuit fault in a permanent magnet generator is not detected it can cause a fire in the generator and its surroundings, thus it is important to be able to detect a short circuit fault in a permanent magnet generator. The reason for this potential fire is that the source of the mechanical torque, as an example, in a wind turbine generator the aerodynamic rotor with a plurality of blades, is connected to the shaft of the generator without a disconnection device to disengage the generator from the mechanical power source, in some cases through a gear box. Thus, even if the rotor is idling slowly, power is applied to the shaft and the faulted spot in the generator is fed with energy.

Most renewable energy power plant such as wind turbine generators, wave energy plant and tidal hydro plants all have their mechanical energy capturing device in a fluid. Thus, it is recommended to avoid standstill or braking if possible, so unless a fault is detected the shaft of the generator rotates most of the time. The possibility to detect the fault current in any operation stage will improve fault handling and make preventive priority actions possible—potentially preventing wind turbine generator fires.

In certain permanent magnet generator and power cable installation configurations, fault detection is based on current measurement at the "receiving" end of the power cable installation at the terminal box. This means that the cables and the generator itself are not monitored for short circuits fault situations. Faults located before the circuit breakers cannot be detected. In the event of a short circuit the converter might not be able detect the resulting current asymmetry and/or the short circuit current. Detection only happens if the converter is in operating mode. Basic monitoring of the electrical installation (generator and main cables and possibly other components in the circuit) is not possible with the setup known from the prior art, which can lead to problems when a drivetrain is idling. In case of short circuit faults, the generator's back EMF will flow power into the fault without detection.

Embodiments of the present invention are used for short circuit detection. In case of a phase to phase short circuit the fault current will be detected if it is higher than the rated current level because Kirchhoff's law still holds on the star point. The principle—and protection possibilities—is the same as if the current detection circuit (e.g., transformers) were located in a circuit breaker up stream, i.e. in the other end of the winding, except that the possibilities for detecting machine internal short circuits are increased.

In an embodiment of the present invention an insulation monitoring uses voltage transformers (not shown in the Figures) for ground fault detection, possibly only before connection of converter, as the high dV/dt's from the switching of power converters may cause false triggering of ground fault protection relays.

In some embodiments, the three phase neutral conductors may be taken to a "void space" where the transformers are located. On "normal" medium size synchronous machines this void space has been included as a part of the internal air cooling system on the machine itself—also allowing for access, maintenance and service etc. Therefore the winding head of the machine may simply flow the total phase currents to the void space with the transformers.

In an embodiment of the present invention the protection system is implemented in a large permanent magnet generator, which is of a segmented type, meaning that each segment operates independent of the other generator segments. If one or more segments fail they can be disconnected and the remaining segments can continue operation, either after a reconfiguration stop or on the fly without a stop.

In an alternative embodiment, multiple measurement transformers may be added (near the winding head) and the current signals are added per phase—either on the analogue side or the digital side of protection system.

FIG. 1 shows a general setup of a wind turbine generator 1. The wind turbine generator 1 includes a tower 2 having a number of tower sections, a nacelle 3 positioned on top of the tower 2, and a rotor 4 extending from the nacelle 3. The tower 2 is erected on a foundation 7 built in the ground. The rotor 4 is rotatable with respect to the nacelle 3, and includes a hub 5 and one or more blades 6. Wind incident on the blades 6 causes the rotor 4 to rotate with respect to the nacelle 3. The mechanical energy from the rotation of the rotor 4 is converted into electrical energy by a generator (not shown) in the nacelle 3. The electrical energy is subsequently converted into a fixed frequency electrical power by a power converter to be supplied to a power grid. The wind turbine generator may also form part of a wind farm or a wind power plant comprising a plurality of wind turbines. All the electrical power generated by the individual wind turbines generators in the wind farm are consolidated and supplied to the power grid via a Point of Common Coupling (PCC).

Although the wind turbine 1 shown in FIG. 1 has three blades 6, it should be noted that a wind turbine may have different number of blades. It is common to find wind turbines having two to four blades. The wind turbine generator 1 shown in FIG. 1 is a Horizontal Axis Wind Turbine (HAWT) as the rotor 4 rotates about a horizontal axis. It should be noted that the rotor 4 may rotate about a vertical axis. Such a wind turbine generators having its rotor rotate about the vertical axis is known as a Vertical Axis Wind Turbine (VAWT). The embodiments described henceforth are not limited to HAWT having 3 blades. They may be implemented in both HAWT and VAWT, and having any number of blades 6 in the rotor 4.

Wind turbine generators are normally connected to an electrical grid. The generator 20 can be considered as a main component, in supplying power to the electrical grid, although the generator may be connected to the grid through a power electronic converter, it is still considered being connected to the grid as long as there is an electrical connection. This connection may be interrupted by means of a circuit breaker 24, or other sorts of electronic switches, such as solid state relays.

Figure 2:
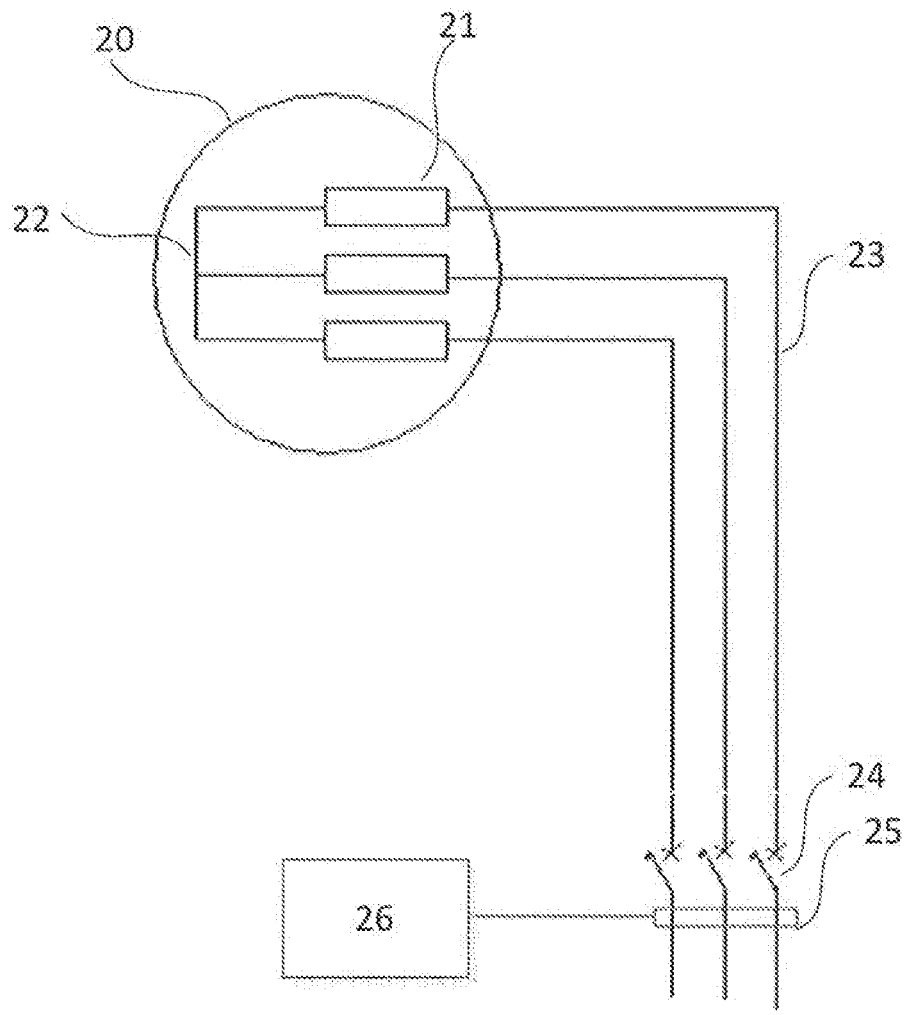
FIG. 2 shows a protection system known from the prior art

FIG. 2 show a protection system known from the prior art. A generator 20 is connected to a circuit breaker 24 through a set of power cables 23. The generator has three phase windings 21 (also referred to herein as stator windings or simply windings), all connected at a star point 22 in the generator. The current flowing in the generator 20 and the power cables 23 are measured by a measurement sensor 25 at a terminal end of the winding, i.e. the ends that are at the terminal box of the generator (terminal box not shown on the Figure). Although FIG. 2 shows the sensor 25 as one unit, each of the three phases may be monitored with its own measurement sensor. The signal from the measurement sensor is communicated to a protection relay 26. The protection relay 26 can trip the circuit breaker 24 if needed.

Figure 3A:
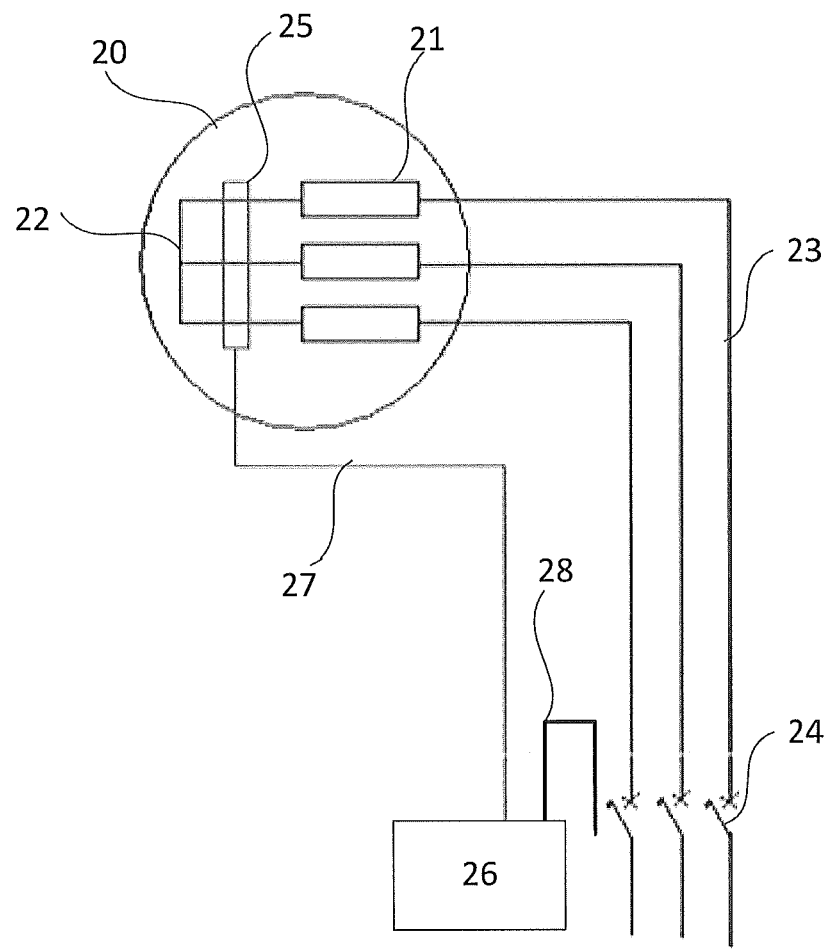
FIG. 3a shows a protection system according to an embodiment of the present invention with a generator in a wye coupling.

FIG. 3A shows an embodiment of the present invention. As shown in FIG. 3A, the measurement sensor 25 is moved to the generator star point 22 providing current load information to the protect relay 26 independent of an operational stage of the generator. In case of e.g. permanent short circuit at idle the fault is detected and preventive measures can be handled by service personnel. A generator 20 is connected to a circuit breaker 24 through a set of power cables 23. The generator has three phase windings 21, all connected at a star point 22 in the generator. The current flowing in the generator 20 and the power cables 23 is measured by a measurement sensor 25. The measurement sensor 25 measures the currents in the windings 21 at the star point end of the windings. The measurement sensor 25 could include a current sensor, such as a current transformer, or an electromagnetic force (EMF) sensor, which measures an electromagnetic force that is indicative of current load information. FIG. 2 shows the sensor 25 as one unit, but in fact each of the three phases may be monitored with its own measurement sensor. The signal from the measurement sensor is communicated to a protection relay 26. The protection relay 26 can trip the circuit breaker 24 if needed.

Figure 3B:
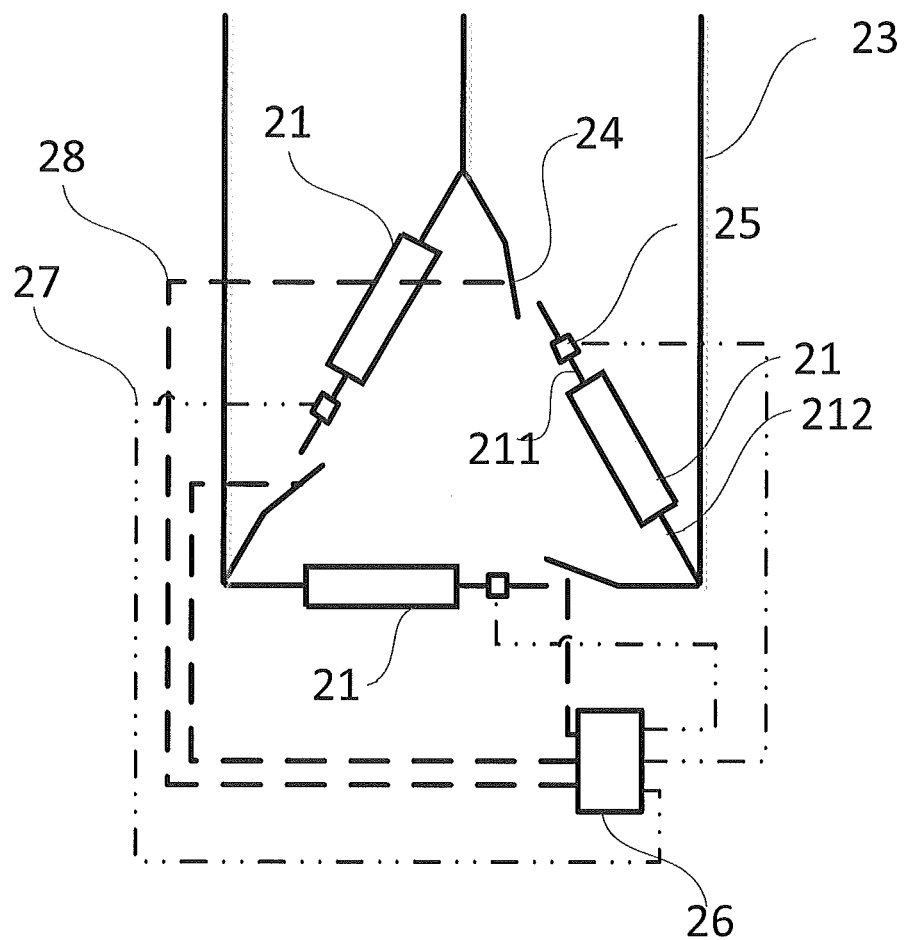
FIG. 3b shows a protection system according to an embodiment of the present invention with a generator in a delta coupling.

FIG. 3B show another embodiment of the present invention. It is a schematic of a set of three stator windings 21, commonly coupled into a delta coupling. The measurement circuit sensor 25 is moved in to the generator delta coupling providing current load information to the protection relay 26 via a communication line 27, independent of operational stage. In case of e.g. permanent short circuit at idle the fault is detected and preventive measures can be handled by service personnel. The generator windings 21 are connected to a set of power cables 23 directly at the second end of each of the windings 212, whereas the first end 211 is connected to a circuit breaker 24, which, in the figure, is split into three branches because in most embodiments the circuit breaker 24 is a three phase circuit breaker. The current flowing in the generator windings 21 and the power cables 23 are measured by measurement sensors 25, which could include a current sensor, such as a current transformer, or an EMF sensor. The signal from the measurement sensor is communicated 27 to a protection relay 26. The protection relay 26 can trip the circuit breaker 24 if needed via communication line 28.

In the specific embodiment presented in FIG. 3B, the circuit breaker 24 is integrated with the delta connection, but in other embodiments not shown, the circuit breaker 24 can alternatively be inserted along the power cables 23.

The power cables 23 connect the generator 20 to an electrical grid or to a power electronic converter (not shown in the Figures).

In another embodiment of the present invention a differential protective circuit can protect the generator by putting in additional measurement sensors on the converter inlet side to measure the current in the stator windings at the terminal ends. With such a configuration, the total phase current of the machine can be measured. This information can be used for control and protection purposes—both for internal machine faults and also for machine external faults.

In one embodiment, the measurement sensors at the terminal ends are current transformers that can also be used for controlling the generator.

A current transformer used for protection according to the present invention may have a high current rating, e.g., 3 times rated current (or higher) of the generator it is intended to protect, in order not to saturate. The need for a high frequency bandwidth is on the other hand limited, so a simple laminated transformer may suffice.

The opposite is the case for transformers used for control purposes, where rated current, or 1-2 times rated current would be sufficient. The control current transformer needs to have a bandwidth similar to the switch frequency of the power converter controlling the generator/motor.

The purpose of having two sets of current transformers, one at each end of each of the windings, is to compare the two sets of signal and to thereby detect if there is a leakage of current. If different types of transformers are used with different accuracy, some error might need to be compensated for.

Figure 4:
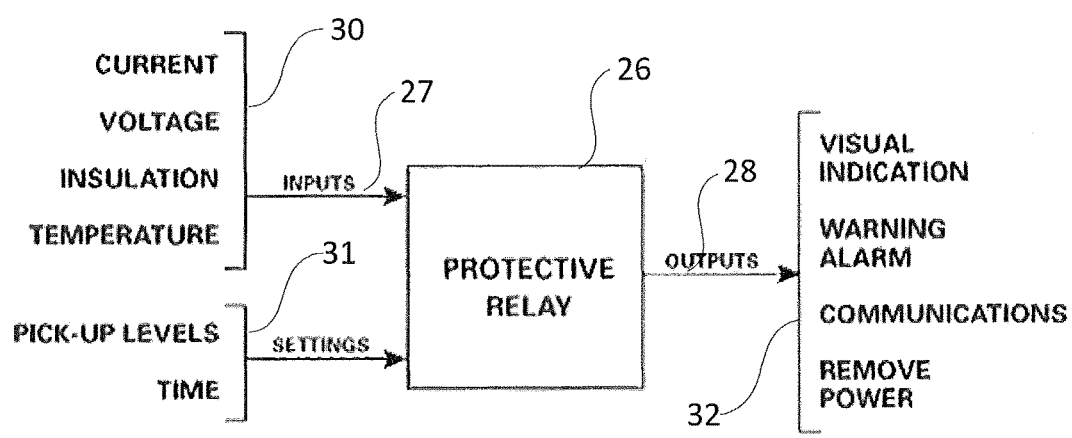
FIG. 4 shows a schematic of a protection relay.

FIG. 4 shows a schematic of a protection relay 26. A protection relay is a complex electromechanical apparatus, often with more than one coil, designed to calculate operating conditions of an electrical circuit and trip circuit breakers when a fault is detected. Unlike switching type relays with fixed and usually ill-defined operating voltage thresholds and operating times, protection relays have well-established, selectable, time/current (or other operating parameter) curves. A set of input signals 30 may be used as input 27 for the protection relay 26. The protection relay also has a number of setting values 31. This can be a current threshold value 31, or others such as voltage threshold, max time of which a given situation may be present. Outputs 28 of the protection relay 26 may include several signals 32, such as a visual indication, a warning alarm, other communications, and/or a remove power command, e.g. a command that causes the circuit breaker 24 feeding a faulty electrical component to trip.

Such protection relays 26 may be elaborate, using arrays of induction disks, shaded-pole magnets, operating and restraint coils, solenoid-type operators, telephone-relay contacts, and phase-shifting networks. Protection relays respond to such conditions as over-current, over-voltage, reverse power flow, over- and under-frequency.

Today's protection relays 26 are nearly entirely replaced with microprocessor-based digital protection relays 26 (numerical relays) that emulate their electromechanical ancestors with great precision and convenience in application. By combining several functions in one package, numerical relays also save capital cost and maintenance cost over electromechanical relays.

In one embodiment the protection relay 26 is integrated together with the circuit breaker 24, and in another embodiment the two are built in separate modules, communicating with each other.

Larger electrical machines 20 often have two or more sets of three stator windings 21. In some embodiments the sets of windings 21a, 21b are inserted in the stator slots (not shown) in a manner that causes the output from each set of windings 21a, 21b to be in electrical phase with each other, but with an angular displacement between the phases within a set.

In another embodiment the sets of windings 21a, 21b are inserted in a configuration that will facilitate an electrically angular displacement between the sets. A displacement of 30 degrees is common, but not limited to this value; angles of 10, 15 or 20 degrees may also be used.

Figure 5:
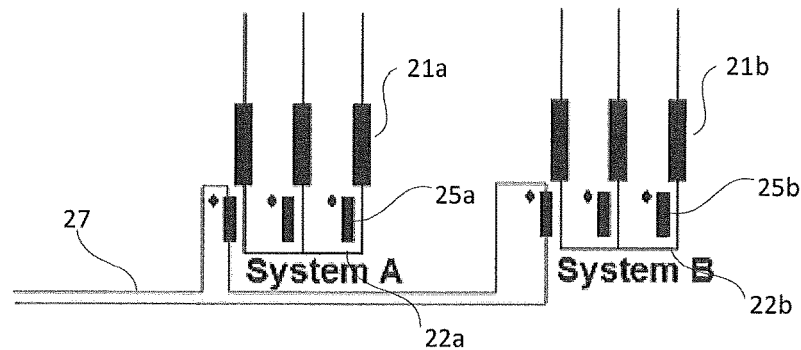
FIG. 5 shows measurement sensors at the star point end of a generator with two sets of three phase windings.

FIG. 5 shows a generator with a double Y connection, i.e., two set of windings 21a, 21b with a star point 22a, 22b. A set of three current sensors 25a, 25b monitor the current in the windings 21a, 21b. The output signals 50 from the sensors 25a, 25b is communicated to the protection relay 26 (not shown in this Figure)

The configuration shown in FIG. 5 can be used if the angle shift between the two systems is 0 degrees. If not, the alternative is to add the measurement currents on a digital basis inside the protection relay 26, thus requiring two sets of signals 27 to be communicated to the protection relay 26.

Although the Figure only shows a configuration with more than one Wye coupling, embodiments of the present invention are not limited to such a configuration. For example, a configuration with more than one delta coupling is also possible.

Figure 6:
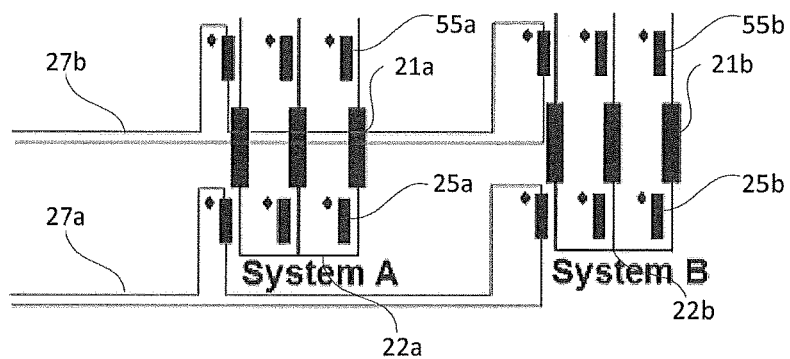
FIG. 6 shows measurement sensors at the star point ends and the terminal ends of the windings in a generator with two sets of three phase windings.

FIG. 6 shows a possible extension of the protection system that will allow for differential monitoring of current. A turn to turn fault on the same phase may be seen as an asymmetry between the three phases. This type of monitoring can be difficult to tweak to a low sensing level and can therefore be quite expensive. The primary problem of a differential system is that an asymmetry also will accrue if unsymmetrical current loading is applied—therefore normally the bias function of the projection relays 26 are "high" and depending both on time and current level discrimination (higher load current equals higher acceptable level of asymmetry—on the time scale higher levels of asymmetry is accepted on short time interval, not for long time periods). The reason for this is to allow for e.g. induction machine inrush currents, which are known to be heavily asymmetrical.

FIG. 6 also shows a generator with a double Y connection, i.e., two set of windings 21a, 21b with a star point 22a, 22b. A set of three current sensors 25a, 25b monitors the current in the windings 21a, 21b. Additionally, the generator may be equipped with another set of current sensors 55a, 55b sensing the current at the oppose end of the winding, the end which can be called the terminal end, as it is close to the terminal box of the generator 20. The output signals 27a, 27b from the sensors 25a, 25b are communicated to the protection relay 26 (not shown in this Figure). Although FIG. 6 shows a configuration with two set of windings 21a, 21b, the configuration with a differential measurement can also be implemented on a generator 20 with one set of windings 21.

FIG. 7 shows prior art protection system where the circuit breaker 24 is located before the cabling 23 and the generator windings 21 all end at the star point 22. The protection relay 26 can only monitor the generator whenever the circuit breaker 24 is closed, meaning that a fault in generator 20 or cables 23 will not be observed unless the circuit breaker 24 is closed.

As mentioned this might be a cause trouble when dealing with permanent magnet generators 20.

FIG. 8 shows an embodiment of the present invention where the circuit breaker 24 is moved to the star point side 22 of the stator winding 21, meaning that the cables 23 are also protected if the generator 20 is running in idling mode.

Figure 9:
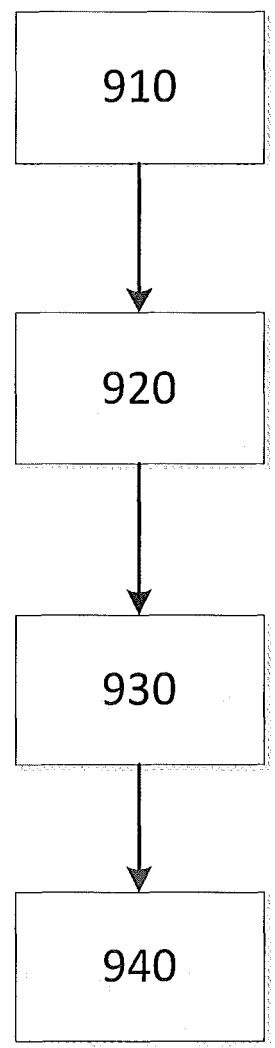
FIG. 9 shows a flow chart of a method according to an embodiment of the present invention.

FIG. 9 shows a flow chart of a method according to an embodiment of the present invention. At step 910 an electrical parameter is measured at the at least one phase winding at a first end, with the at least one measurement sensor. Next, at step 920 the measured parameter is communicated to the protection relay. Then, at step 930 the measured electrical parameter is compared with a threshold value. Finally in step 940, the at least one protection relay is tripped if said measured electrical parameter is beyond the threshold value.

Embodiments of the present invention relate to a protection system with a protection relay and at least one measurement sensor to protect a permanent magnet generator having a plurality of stator windings, each of said stator windings having a first end and a second end, and wherein if the stator windings are connected in a wye coupling, they are, in a set of three stator windings, commonly coupled in a star point at the first end of each of the stator windings, and if the stator windings are connected in a delta coupling, they are, in a set of three stator windings, commonly connected in a ring to each other. The measurement sensor is arranged for measuring a parameter at the first end of at least one of the stator windings and for communicating with the protection relay. The invention also relates to a method of protecting a permanent magnet generator.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that any references made to a generator, also apply to many other types of generators, e.g. motor, synchronous condenser etc.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

What is claimed is:

1. A protection system for protecting a permanent magnet generator with a plurality of sets of stator windings, the protection system comprising:
    a protection relay; and
    at least one measurement sensor corresponding to each set of the plurality of sets of stator windings,
    wherein each of the plurality of sets of stator windings is connected in at least one of a wye coupling and a delta coupling,
    wherein each of the plurality of sets of stator windings is electrically phase shifted in relation to each other, and wherein the protection relay is configured to compensate for the phase shift between the plurality of sets of stator windings,
    wherein the protection relay is configured to selectively activate first circuit breakers based on parameters values measured by the at least one measurement sensors.

2. The protection system according to claim 1, wherein the at least one measurement sensors are current sensors for measuring the current in at least one stator winding in each of the plurality of sets of stator windings.

3. The protection system according to claim 1, wherein the generator further comprises a second circuit breaker configured to disconnect the generator from an electrical grid, and wherein the protection relay communicates with the second circuit breaker.

4. The protection system according to claim 3, wherein the plurality of sets of stator windings is commonly connected.

5. The protection system according to claim 4, wherein each of the plurality of sets of stator windings has at least one protection relay.

6. The protection system according to claim 1, wherein the protection system further comprises at least one additional measurement sensor to measure a parameter at a terminal end of at least one of the stator windings, and wherein the protection relay is arranged for communicating with the at least one additional measurement sensor and the at least one measurement sensors and comparing measured parameters.

7. The protection system according to claim 6, wherein a terminal end of each of the stator windings in the plurality of sets of stator windings is coupled with the at least one additional measurement sensor.

8. A permanent magnet generator with the protection system according to claim 1.

9. The protection system according to claim 1, wherein first ends of each of stator windings in the plurality of sets of stator windings are coupled with the at least one measurement sensors.

10. A method for protecting a permanent magnet generator with a protection system comprising a protection relay and at least one measurement sensor corresponding to each of a plurality of sets of stator windings each arranged in one of a wye coupling and a delta coupling, the method comprising:
    measuring parameter values using the at least one measurement sensors;
    communicating the measured parameter values to the protection relay;
    comparing at least one of the measured parameter values with a first threshold value;
    tripping the protection relay if the at least one measured parameter value is beyond the first threshold value; and
    compensating for a phase shift between the plurality of sets of stator windings using the protection relay, wherein each of the plurality of sets of stator windings is electrically phase shifted in relation to each other.

11. The method for protecting the permanent magnet generator according to claim 10, wherein said parameter is a current in at least one stator winding.

12. The method for protecting the permanent magnet generator according to claim 11, wherein each of the plurality of sets of stator windings has at least one protection relay:
    upon the at least one measured parameter value being above the first threshold value, selecting the protection relay corresponding to a set of the plurality of sets of stator windings related to the at least one measured parameter value, and
    disconnecting the set of the plurality of sets of stator windings via the selected protection relay.

13. The method for protecting the permanent magnet generator according to claim 10, wherein the protection relay protects each set of the plurality of sets of stator windings individually.

14. The method for protecting the permanent magnet generator according to claim 10, the method further comprising:
    measuring a parameter at a terminal end of at least one stator winding,
    communicating the terminal end measured parameter to the protection relay,
    finding a difference between the terminal end measured parameters and one of the measured parameter values measured at an opposite end of the terminal end of the at least one stator winding, and
    tripping the protection relay if said difference is beyond a second threshold value.

* * * * *